United States Patent
Joo et al.

(10) Patent No.: US 10,332,474 B2
(45) Date of Patent: Jun. 25, 2019

(54) DISPLAY APPARATUS HAVING POWER SUPPLY DEVICE WITH POWER FACTOR COMPENSATION AND POWER SUPPLY METHOD THEREOF

(71) Applicant: SAMSUNG ELECTRONICS CO., LTD., Suwon-si, Gyeonggi-do (KR)

(72) Inventors: Sung-yong Joo, Hwaseong-si (KR); Jin-hyung Lee, Anyang-si (KR); Moon-young Kim, Pohang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 42 days.

(21) Appl. No.: 15/389,999

(22) Filed: Dec. 23, 2016

(65) Prior Publication Data

US 2017/0310224 A1 Oct. 26, 2017

(30) Foreign Application Priority Data

Apr. 21, 2016 (KR) .................. 10-2016-0048881

(51) Int. Cl.
| | | |
|---|---|---|
| *G09G 3/34* | (2006.01) | |
| *G09G 3/36* | (2006.01) | |
| *H02M 1/42* | (2007.01) | |
| *H02M 3/337* | (2006.01) | |
| *H02M 1/00* | (2006.01) | |

(52) U.S. Cl.
CPC .......... *G09G 3/3696* (2013.01); *G09G 3/3406* (2013.01); *H02M 1/4225* (2013.01); *G09G 2320/064* (2013.01); *G09G 2320/0653* (2013.01); *G09G 2330/022* (2013.01); *H02M 3/3376* (2013.01); *H02M 2001/007* (2013.01); *H02M 2001/0035* (2013.01); *Y02B 70/126* (2013.01); *Y02B 70/16* (2013.01)

(58) Field of Classification Search
CPC ...................................................... G09G 3/3406
USPC ........................................................... 345/211
See application file for complete search history.

(56) References Cited

U.S. PATENT DOCUMENTS

| | | |
|---|---|---|
| 6,903,536 B2 | 6/2005 | Yang |
| 8,040,114 B2 | 10/2011 | Saint-Pierre |
| 8,278,900 B2 | 10/2012 | Strijker et al. |
| 8,339,813 B2 | 12/2012 | Wang et al. |
| 8,699,250 B2 | 4/2014 | Young et al. |
| 2011/0085354 A1* | 4/2011 | Wang .................. H02M 1/4225 363/21.02 |

(Continued)

FOREIGN PATENT DOCUMENTS

| | | |
|---|---|---|
| JP | 2014-233110 | 12/2014 |
| KR | 10-0819436 | 4/2008 |
| WO | WO 2015/079722 | * 6/2015 |

*Primary Examiner* — Long D Pham
(74) *Attorney, Agent, or Firm* — Nixon & Vanderhye P.C.

(57) ABSTRACT

A display apparatus is provided. The display apparatus includes a display configured to display an image, an image signal provider circuit configured to provide an image signal to the display, and a power supply configured to generate driving power and to supply the generated driving power to the image signal provider, wherein the power supply controls an operation time of a power factor compensation (PFC) circuit which performs power factor compensation of the display apparatus based on a size of an output load receiving the driving voltage.

19 Claims, 7 Drawing Sheets

(56) References Cited

U.S. PATENT DOCUMENTS

| | | | |
|---|---|---|---|
| 2013/0169697 A1* | 7/2013 | Park | G09G 3/2003 |
| | | | 345/690 |
| 2013/0342519 A1* | 12/2013 | Kim | G09G 3/3225 |
| | | | 345/211 |
| 2014/0035375 A1 | 2/2014 | Vogman | |
| 2014/0268905 A1 | 9/2014 | Reddy | |
| 2015/0028821 A1 | 1/2015 | Lu et al. | |
| 2016/0294273 A1* | 10/2016 | Kawamura | H02M 3/33523 |

* cited by examiner

DISPLAY APPARATUS HAVING POWER SUPPLY DEVICE WITH POWER FACTOR COMPENSATION AND POWER SUPPLY METHOD THEREOF

CROSS-REFERENCE TO RELATED APPLICATION

This application is based on and claims priority under 35 U.S.C. § 119 to Korean Patent Application No. 10-2016-0048881, filed in the Korean Intellectual Property Office on Apr. 21, 2016, the disclosure of which is incorporated by reference herein in its entirety.

BACKGROUND

1. Field

The present disclosure relates generally to a power supply device, a display apparatus having the same, and a power supply method thereof, and for example to a power supply which can control the operation time of a power factor compensation circuit based on the size of an output load to minimize and/or reduce the power consumed by the power supply device, a display apparatus having the same, and a power supply method thereof.

2. Description of Related Art

The display apparatus is a device that processes and displays digital or analog image signals received from the outside or various image signals stored in compressed files of various formats in an internal storage device.

In a large-sized display apparatus, a power factor compensation (PFC) circuit and an LLC resonant circuit are implemented. The power factor compensating circuit is a circuit for compensating the power factor of the system. In the related art, the switching operation in the PFC circuit was stopped when the display apparatus was operated in the standby mode. Accordingly, the LLC resonant circuit must receive a low voltage in place of a burst voltage, and generate a driving voltage necessary for the system. Therefore, the LLC resonant circuit has a problem in that the efficiency is lower than when the driving voltage required for the system is generated by the burst voltage.

However, recent display devices often perform certain functions even in the standby mode (or the power saving mode and the standby mode), and a power supply device capable of operating with high efficiency even in the standby mode is required.

SUMMARY

Aspects of the present disclosure are provided to address at least the above-mentioned problems and/or disadvantages and to provide at least the advantages described below. Accordingly, an example aspect of the present disclosure is to provide a power supply device that controls the operation time of the power factor compensation circuit based on the size of the output load to minimize and/or reduce power consumption of the power supply device, a display apparatus having the same, and a power supply method.

According to an aspect of an example embodiment, an image forming apparatus includes a display configured to display an image, an image signal provider comprising image providing circuitry configured to provide an image signal to the display, and a power supply configured to generate driving power and to supply the generated driving power to the image signal provider, wherein the power supply is configured to control an operation time of a power factor compensation(PFC) circuit configured to perform power factor compensation of the display apparatus based on a size of an output load receiving the driving voltage.

In this case, the power supply may control the operation time of the PFC circuit so that the PFC circuit operates at a time proportional to the size of the output load.

The power supply may, in response to the size of the output load exceeding a predetermined size, control the PFC circuit to operate, and in response to the size of the output load being equal to or less than a predetermined size, control an operation time of the PFC circuit to have a proportional operation time within the predetermined size range.

The power supply may provide a Vcc voltage to the PFC circuit for the operation time.

The power supply includes a rectifier configured to rectify external AC power to DC power, a PFC circuit configured to selectively operate in a burst mode using the rectified DC power, a converter comprising circuitry configured to transform an output voltage of the PFC circuit into the driving power and to output the transformed power, and a sensor configured to sense a size of an output load receiving the driving power, wherein the converter is configured to control an operation time of the PFC circuit based on the size of the output load sensed by the sensor.

The converter may include an LLC resonant converter configured to operate using a plurality of switches, and an LLC controller configured to control operations of the plurality of switches, and to control the operation time of the PFC circuit based on the size of the output load sensed by the sensor.

The LLC controller may provide the PFC controller with a Vcc voltage for a time proportional to the output load size sensed by the sensor.

The LLC controller may, in response to the size of the output load exceeding a predetermined size, provide a Vcc voltage to the PFC controller, and in response to the size of the output load being equal to or less than a predetermined size, provide a Vcc voltage to the PFC controller for a proportional operating time within the predetermined size range.

The LLC controller may control the plurality of switches and the operation time of the PFC circuit asymmetrically.

The PFC circuit may include an inductor having one end configured to receive the rectified DC power, a first switch having one end connected to another end of the inductor and having another end that is grounded, a first diode having an anode commonly connected to the one end of the first switch and the another end of the inductor and having a cathode connected to the converter, and a PFC circuit configured to operate based on a Vcc voltage and to control an operation of the first switch.

The sensor may include at least one of: a photocoupler, a flyback circuit, and a half bridge circuit.

The display includes an LED backlight, and the power supply may generate a second driving voltage having different voltage from the driving voltage, and provide the generated second driving voltage to the LED backlight.

A power supply device according to an example embodiment of the present disclosure includes a rectifier configured to rectify external AC power to DC power, a PFC circuit configured to selectively operate in a burst mode using the rectified DC power, a converter comprising circuitry configured to transform an output voltage of the PFC circuit into a predetermined first output power and to output the transformed power, and a sensor configured to sense a size of an output load connected to the converter, wherein the converter is configured to control an operation time of a first switch corresponding to the size of the output load sensed by the sensor.

The converter may include an LLC resonant converter configured to operate using a plurality of switches, and an LLC controller configured to control operations of the plurality of switches, and to control the operation time of the PFC circuit based on the size of the output load sensed by the sensor.

The LLC controller may provide the PFC controller with a Vcc voltage for a time proportional to the output load size sensed by the sensor.

The LLC controller may, in response to the size of the output load exceeding a predetermined size, provide a Vcc voltage to the PFC controller, and in response to the size of the output load being equal to or less than a predetermined size, provide a Vcc voltage to the PFC controller for a proportional operating time within the predetermined size range.

The PFC circuit may include an inductor having one end configured to receive the rectified DC power, a first switch having one end connected to another end of the inductor and having another end that is grounded, a first diode having an anode commonly connected to the one end of the first switch and the another end of the inductor and having a cathode connected to the converter, and a PFC circuit configured to operate based on a Vcc voltage and to control an operation of the first switch.

The LLC resonant converter may include a primary winding and a plurality of second windings connected to a center tab; a second switch and a third switch connected in series, a first capacitor having one end connected to the center tab and having another end is connected to the primary winding; a second diode having an anode connected to one end of one of the plurality of secondary windings, a third diode having an anode is connected to one end of another one of the plurality of secondary windings, and a second capacitor having one end commonly connected to a cathode of the second diode and a cathode of the third diode, and having another end connected to the center tab.

The sensor may include at least one of a photocoupler, a flyback circuit, and a half bridge circuit.

A power supply method of a power supply device includes rectifying external AC power to DC power, selectively outputting the rectified DC power in a burst mode using a PFC circuit performing a power factor compensating operation, transforming an output voltage of the PFC circuit into a predetermined driving power, sensing a size of an output load receiving the driving power, and controlling an operation time of the PFC circuit based on the sensed output load size.

BRIEF DESCRIPTION OF THE DRAWINGS

The above and other aspects of the present disclosure will become more apparent and more readily understood from the following detailed description, taken in conjunction with the accompanying drawings, in which like reference numerals refer to like elements, and wherein.

DETAILED DESCRIPTION

Figure 1:
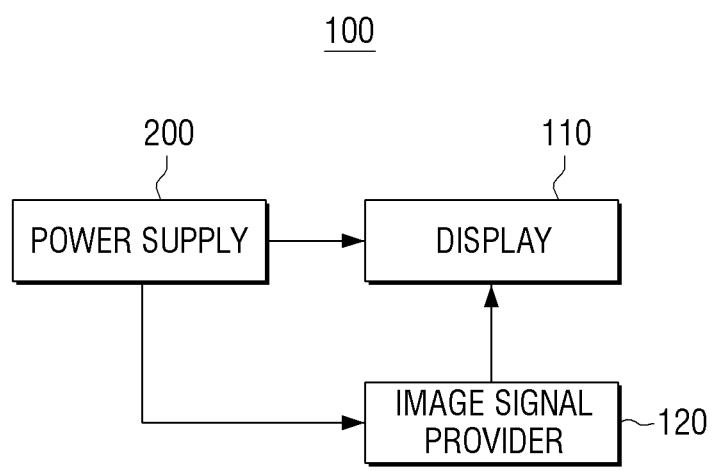
FIG. 1 is a block diagram illustrating an example configuration of a display apparatus according to an example embodiment of the present disclosure.

The various example embodiments of the present disclosure may be diversely modified. Accordingly, specific example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail since they may obscure the disclosure with unnecessary detail.

The terms "first", "second", etc. may be used to describe diverse components, but the components are not limited by the terms. The terms are only used to distinguish one component from the others.

The terms used in the present application are only used to describe the example embodiments, but are not intended to limit the scope of the disclosure. The singular expression also includes the plural meaning as long as it does not conflict in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof In the example embodiments of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in greater detail with reference to the accompanying drawings.

FIG. 1 is a block diagram illustrating an example configuration of a display apparatus according to an example embodiment of the present disclosure.

Referring to FIG. 1, a display apparatus 100 according to an example embodiment of the present disclosure may include a display 110, an image signal provider (e.g., including circuitry for providing an image signal) 120, and a power supply 200.

The display 110 displays an image. The display 110 may be an LCD panel that displays light by transmitting light emitted from a backlight through an LCD or by controlling the degree of transmission, or may be an OLED panel that emits light corresponding to a direct image, or the like, but is not limited thereto. If the display 110 operates using a backlight, the display 110 receives power required for the backlight through the power supply 200, which will be described in greater detail below, and transmits the light emitted from the backlight to the LC.

Here, the backlight may be configured to emit light to the LCD, and the backlight may be comprised of a cold cathode fluorescent lamp (CCFL) and a light emitting diode (LED). Hereinafter, the backlight is illustrated as including a light emitting diode and a light emitting diode driving circuit, but may be implemented in other configurations than the LED at the time of implementation.

The image signal provider 120 may include various circuitry that provides an image signal to the display 110. Specifically, the image signal provider 120 may supply various image signals for displaying image data and/or image data to the display 110 in accordance with the image data.

The power supply 200 supplies power to each configuration in the display apparatus 100. Specifically, the power supply 200 generates driving power for driving the display apparatus 100, and supplies the generated driving power to each configuration. If a plurality of driving voltages having different sizes are required for the display apparatus 100, the power supply 200 can generate a plurality of driving voltages and supply power to each configuration. Such a configuration will be described in greater detail below with reference to FIG. 5.

Also, the power supply 200 may include a power factor compensation (PFC) circuit to compensate the power factor of the power supply. At this time, the power supply 200 can control the operation time of the power factor compensation circuit according to the size of the output load receiving the driving voltage. Specifically, the power supply 200 can control the operation time of the power factor compensation circuit so that the power factor compensation circuit performs power factor compensation only at a time proportional to the size of the output load. The power supply 200 controls the power factor compensation circuit to always perform the power factor compensating operation when the size of the output load exceeds a predetermined size, and control the operation time of the power factor compensation circuit to perform the proportional power factor compensating operation within a predetermined size range when the size of the output load is equal to or less than a predetermined size. The specific configuration and operation of the power supply 200 will be described in greater detail below with reference to FIG. 3 to FIG. 6.

Figure 2:
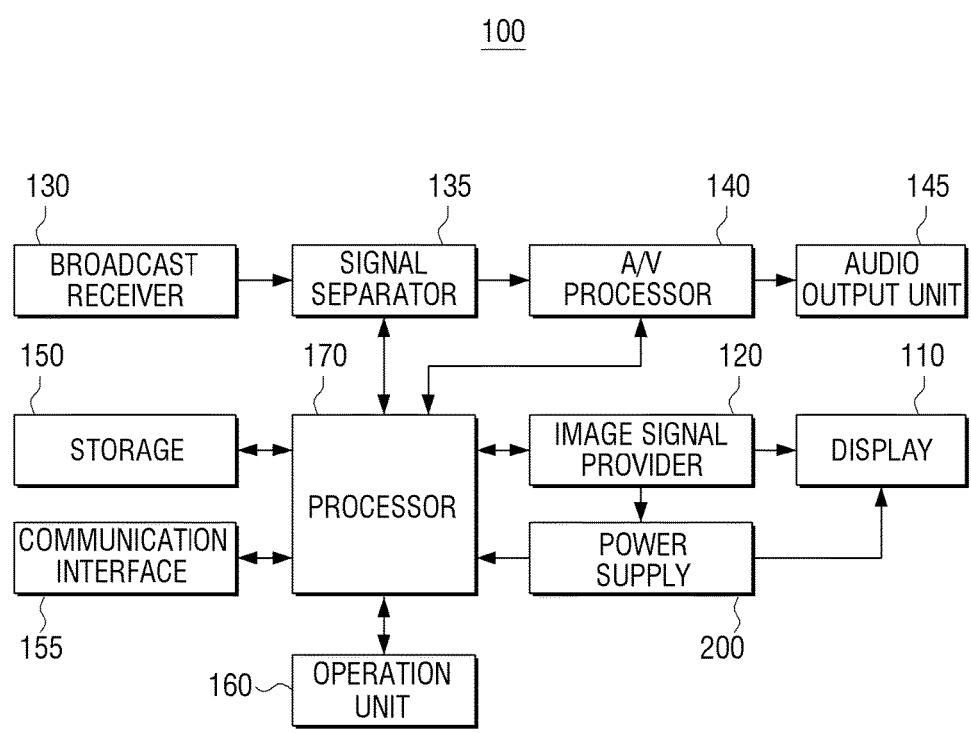
FIG. 2 is a block diagram illustrating an example configuration of a display apparatus according to an example embodiment of the present disclosure.

Although only a simple configuration of the display apparatus 100 has been described above, the display apparatus 100 may include a configuration as illustrated, for example, in FIG. 2. A specific configuration of the display apparatus 100 will be described in greater detail below with reference to FIG. 2.

FIG. 2 is a block diagram illustrating an example configuration of a display apparatus according to an example embodiment of the present disclosure.

Referring to FIG. 2, the display apparatus 100 according to the present embodiment includes a display 110, an image signal provider (e.g., including circuitry for providing an image signal) 120, a broadcast receiver 130, a signal separator (e.g., including signal separating circuitry) 135, an A/V processor 140, an audio output unit (e.g., including audio output circuitry) 145, a storage 150, a communication interface (e.g., including communication circuitry) 155, an operation unit 160, a processor (e.g., including processing circuitry) 170, and a power supply 200.

The operation of the display 110 and the power supply 200 is the same as that of FIG. 1, and redundant description is omitted. In the illustrated example, the power supply 200 supplies power only to the display 110 and the processor 170. However, the power supply 200 may be configured to supply power to all configurations that require power within the display apparatus 100.

The broadcast receiver 130 can receive and demodulate broadcasts from a broadcasting station or satellite by wire or wirelessly.

The signal separator 135 may include various circuitry to separate the broadcast signal into an image signal, an audio signal, and an additional information signal. The signal separator 135 may transmit the image signal and the audio signal to the A/V processer 140.

The A/V processer 140 may include various circuitry configured to perform signal processing such as video decoding, video scaling, and audio decoding on the video signal and the audio signal input from the broadcast receiver 130 and the storage 150. The A/V processer 140 outputs the video signal to the image signal provider 120, and outputs the audio signal to the audio output unit 145.

On the other hand, when the received image and audio signals are stored in the storage 150, the A/V processer 140 may output the video and audio to the storage 150 in a compressed form.

The audio output unit 145 may include various circuitry that converts the audio signal output from the A/V processor 140 into a sound and outputs the sound through a speaker (not shown) or outputs the sound to an external device connected through an external output terminal (not shown).

The image signal provider 120 may include various circuitry configured to generate a Graphic User Interface (GUI) for providing to the user. The image signal provider 120 may add the generated GUI to the image output from the A/V processor 140. The image signal provider 120 may provide the display 110 with an image signal corresponding to the image to which the GUI is added. Accordingly, the display 110 may display various kinds of information provided by the display apparatus 100 and an image transmitted from the image signal provider 120.

The image signal provider 120 may extract brightness information corresponding to the image signal and generate a dimming signal corresponding to the extracted brightness information. The image signal provider 120 may provide the generated dimming signal to the display 110. This dimming signal may be a PWM signal for backlight control. In the present example embodiment, the dimming signal is generated by the image signal provider 120 and is provided to the display 110. However, the dimming signal may be generated and used by the display 110 which receives the image signal at the time of implementation. In the above embodiment, the dimming signal for backlight control is provided only to the display 110. However, the dimming signal may also be provided to the power supply 200.

The storage 150 may store image content. Specifically, the storage 150 may receive and store video and audio compressed image contents from the A/V processor 140, and may output the stored image contents under the control of the processor 170 to the A/V processor 140. The storage 150 may be implemented by a hard disk, a nonvolatile memory, and/or a volatile memory.

The operation unit 160 may be implemented using various circuitry, such as, for example, and without limitation, a touch screen, a touch pad, a key button, a keypad, or the like, and provides a user operation of the display apparatus 100. In the present embodiment, the control command is input through the operation unit 160 of the display apparatus 100. However, the operation unit 160 may receive a user operation from an external control device (for example, a remote control).

The communication interface 155 may include various circuitry configured to connect the display apparatus 100 to an external device (not shown), and is connected to an external device via a local area network (LAN) and Internet or a Universal Serial Bus (USB) port.

A processor 170 controls overall operations of the display apparatus 100. Specifically, the processor 170 may control the image signal provider 120 and the display 110 such that an image according to a control command input through the operation unit 160 is displayed.

The processor 170 may determine the operating state of the display apparatus 100. Specifically, the processor 170 may determine a normal mode when the display operation of the display 110 is required, and may determine the standby mode (or the power saving mode or the standby mode) when the display operation of the display 110 is not required. The standby mode may be a state of waiting for a user operation (e.g. power-on command), a state of outputting only audio without displaying a screen, or an IoT communication state of performing communication with other external devices in the vicinity.

As described above, in the display apparatus 100 according to the present embodiment, the operation time of the PFC circuit is controlled according to the state of the output load, so that the power consumption in the power supply can be reduced in the standby mode and that the standby power of the mobile terminal can be reduced.

In the description of FIG. 2, the above-described functions are applied only to the display apparatus receiving and displaying the broadcast. However, the power supply device as described below can be applied to any electronic device having a display.

In the above description, the power supply 200 is included in the display apparatus 100, but the function of the power supply 200 may be implemented as a separate device. Hereinafter, a separate power supply that performs the same function as the power supply 200 will be described with reference to FIG. 3.

Figure 3:
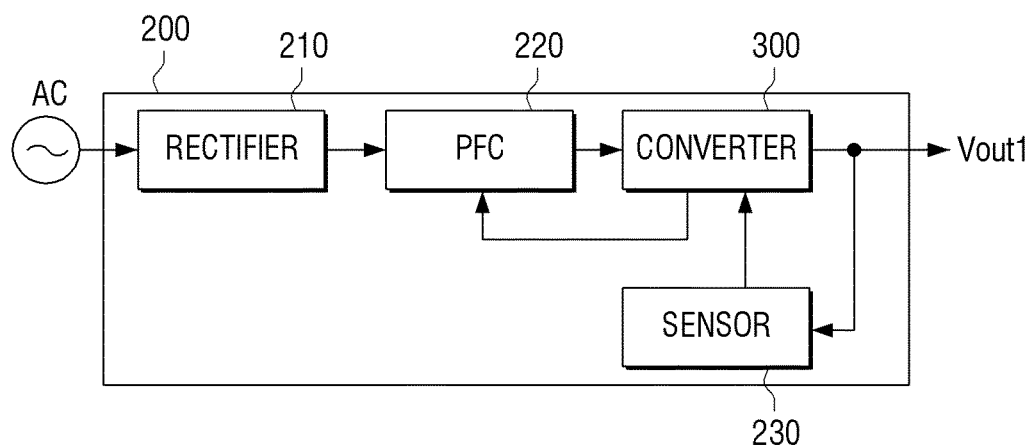
FIG. 3 is a block diagram illustrating an example configuration of a power supply device according to an example embodiment of the present disclosure.

FIG. 3 is a block diagram illustrating an example configuration of a power supply apparatus according to an example embodiment of the present disclosure.

Referring to FIG. 3, the power supply 200 may include a rectifier 210, a PFC circuit 220, a converter 300, and a sensor 230.

The rectifier 210 rectifies the external AC power to the DC power. Specifically, the rectifier 210 can rectify external AC power using a rectifying circuit such as a full bridge diode circuit.

The PFC circuit 220 can compensate the power factor by matching the voltage and current of the rectified AC power source in phase. Specifically, the PFC circuit 220 can selectively operate in the burst mode using the rectified DC power. The PFC circuit 220 boosts the rectified AC power (about 140 V) and outputs the boosted AC power (about 340 V). When the PFC circuit 220 does not operate in the burst mode, the PFC circuit 220 may output the rectified AC power (about 140 V) without boosting. However, in the present embodiment, even when the power supply device 200 has a low output load or operates in the standby mode, the power supply device 200 always operates in the burst mode to output the boosted power. The PFC circuit 220 may include a smoothing unit (specifically, a capacitor) for smoothing the rectified AC power.

The converter 300 transforms the output voltage of the PFC circuit 220 into driving power and outputs the converted power. Such a converter 300 may be implemented with an LLC resonant converter, but is not limited thereto.

The converter 300 controls the operation time of the PFC according to the size of the output load sensed by the sensor 230, which will be described later. Specifically, the converter 300 provides the Vcc voltage to the PFC circuit 220 only for a time proportional to the size of the output load sensed by the sensor 230 so that the PFC circuit 220 performs the power factor compensating operation only for a time proportional to the sensed size of the output load.

Alternatively, the converter 300 may provide a Vcc voltage to the PFC when the magnitude of the output load exceeds a predetermined magnitude, so that the power factor compensation operation is continuously performed in a period in which the size of the output load exceeds a predetermined size. Alternatively, the converter 300 provides the Vcc voltage to the PFC circuit 220 only for a proportional operating time within a predetermined size range when the sensed output load size is less than a predetermined size, so that the compensation operation can be performed. Here, the Vcc voltage is a driving voltage input to the PFC controller for controlling the switching operation of the PFC. As described above, in this embodiment, the PFC operation is controlled by using the power source of the PFC without using a separate control line, so that it is possible to design more easily.

The control of the operating time of the PFC can be performed periodically. For example, when the operation period of the PFC is 10 ms, if the driving time is determined to be 1/10 according to the output load, the process of applying the Vcc power for 1 ms and then not applying the Vcc power for 9 ms may be performed repeatedly. If the size of the output load is changed during this process, the application time of Vcc can be adjusted corresponding to the size of the changed load. Therefore, the operation period of the PFC can be controlled to a duty ratio corresponding to the sensed output load.

In the present embodiment, the PFC power source is used as the control target, but it is also possible to implement the above-described operation by inputting a separate control signal to the PFC controller.

The sensor 230 senses the size of the output load receiving the driving power. More specifically, the sensor 230 may provide, to the converter 300, information on the size of the output load connected to the output terminal of the converter 300 (or the size of the current flowing in the output terminal) using a photo coupler, a flyback circuit, a half bridge circuit, etc.

As described above, the power supply apparatus 200 according to the present embodiment controls the driving time of the PFC in accordance with the size of the output load, so that the PFC operates even in the standby mode of the display apparatus, and thereby the conversion efficiency in the converter 300 is improved. Accordingly, the standby power of the power supply 200 also decreases.

Figure 4:
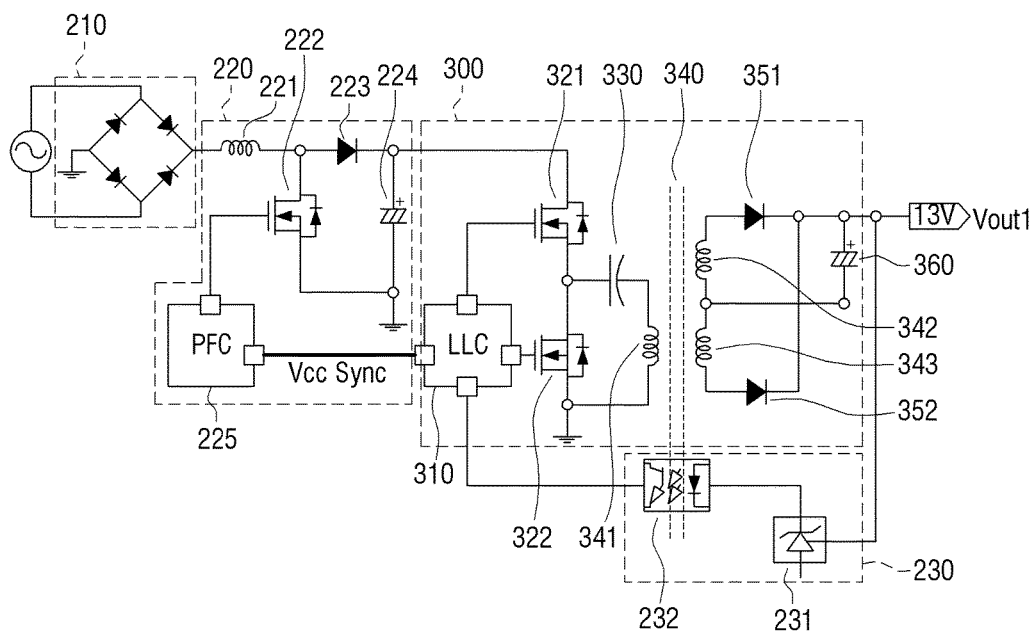
FIG. 4 is a circuit diagram illustrating an example power supply device according to an example embodiment of the present disclosure.

FIG. 4 is a circuit diagram illustrating an example configuration of a power supply apparatus according to an example embodiment of the present disclosure.

Referring to FIG. 4, the power supply 200 according to the first embodiment may include a rectifier 210, a PFC circuit 220, a converter 300, and a sensor 230.

The rectifier 210 rectifies the external AC power to the DC power. Specifically, the rectifier 210 may be configured as a full bridge diode circuit.

The PFC circuit 220 coincides the voltage and current of the rectified AC power source in phase. Specifically, the PFC circuit 220 may include an inductor 221, a first switch 222, a first diode 223, a capacitor 224, and a PFC controller 225. In this embodiment, the PFC is implemented as illustrated in FIG. 4, but a PFC can be configured in a form other than the configuration shown in FIG. 4, if the circuit configuration can compensate the power factor using the burst mode.

One end of the inductor 221 is connected to the rectifier 210 and receives rectified DC power. The other end of the inductor 221 is commonly connected to the anode of the first diode 223 and one end of the first switch 222.

One end of the first switch 222 is commonly connected to the other end of the inductor 221 and the anode of the first diode 223 and the other end of the first switch 222 is grounded and performs a switching operation according to a driving signal of the PFC controller 225.

The anode of the diode 223 is commonly connected to the other end of the inductor 221 and one end of the first switch 222 and the cathode thereof is commonly connected to one end of the capacitor 224 and the converter 300.

One end of the capacitor 224 is commonly connected to the cathode of the diode 223 and the converter 300, and the other end is grounded together with the other end of the first switch 222.

The PFC controller 225 operates according to the Vcc voltage and controls the connection state of the first switch 222 to match the voltage and current of the AC power rectified by the rectifier 210 in the same phase. Specifically, when the Vcc voltage is input, the PFC controller 225 may vary the on/off state of the first switch 222 to match the voltage and current of the AC power rectified by the rectifier 210 in the same phase. If the Vcc voltage is not input, the PFC controller 224 does not output a control signal for controlling the first switch 222. In this case, the first switch 222 can maintain the OFF state. However, since the voltage of the capacitor 224 is increased by the preceding burst mode, the rectified AC power is not transmitted by the diode 223.

The converter 300 transforms the output voltage of the PFC circuit 220 into driving power and outputs the converted power. The converter 300 may be implemented as an LLC resonant converter. When the converter 300 is implemented as an LLC resonant converter, the converter 300 may include an LLC controller 310, a second switch 321, a third switch 322, a second capacitor 330, a transformer 340, a second diode 351, a third diode 352, and a third capacitor 360. On the other hand, the circuit configuration of the illustrated LLC resonant converter is an example. Therefore, the LLC resonant converter circuit may be implemented with another circuit configuration performing the same function.

The second switch 321 has one end connected to the output terminal of the PFC 223 and the other end connected to one end of the third switch 322.

One end of the third switch 322 is connected to the other end of the second switch 321, and the other end is grounded. In this way, the second switch 321 and the third switch 322 are connected in series, and perform the switching operation under the control of the LLC controller 310.

One end of the second capacitor 330 is commonly connected to the other end of the second switch 321 and one end of the third switch 322 and the other end is connected to one end of the primary winding of the transformer 340.

The transformer 340 has a primary winding 341 and a plurality of secondary windings 342 and 343, and the primary winding and the plurality of secondary windings can have predetermined winding ratios. Here, one end of the primary winding 341 is connected to the other end of the second capacitor 330, and the other end of the primary winding 341 is grounded. One end of the secondary winding 342 is connected to the anode of the third diode 351 and the other end is commonly connected to one end of the other secondary winding 343 and the other end of the third capacitor 360. One end of the secondary winding 343 is commonly connected to the other end of the other secondary winding 343 and the other end of the third capacitor 360 and the other end is connected to the anode of the third diode 352.

On the other hand, in this embodiment, since the burst voltage is transmitted to the transformer 340 side even in the power saving mode, the change width of the input voltage of the transformer 340 is improved as compared with the conventional case. As a result, the input voltage of the transformer 340 can be changed narrower, which is advantageous for the input/output margin. Also, even when the turn ratio of the primary and secondary windings of the transformer is configured, it is also possible to select the wire based on the portion where the temperature is advantageous.

Also, since the always burst voltage is input and the input voltage of the LLC resonant converter is set high, in the burst mode, even when the load rises sharply, it is possible to operate without changing the output voltage.

The anode of the second diode 351 is connected to one end of the secondary winding 342 and the cathode thereof is commonly connected to the cathode of the third diode 352 and one end of the third capacitor 360.

The anode of the third diode 352 is connected to the other end of the secondary winding 343 and the cathode of the third diode 352 is commonly connected to the cathode of the second diode 351 and one end of the third capacitor 360.

One end of the third capacitor 360 is commonly connected to the cathode of the second capacitor 351 and the cathode of the third capacitor 352 and the other end is connected to the center tab of the transformer 340. Accordingly, the center tab side operates with the reference voltage (secondary side ground) of the output voltage, and the voltage of the third capacitor 360 becomes the driving voltage.

The LLC controller 310 controls the operations of the second switch 321 and the third switch 322 so as to output a predetermined driving voltage. This operation is a general operation in the LLC resonant converter and the operation of the LLC control part related to it will be omitted herein.

The LLC controller 310 may provide the PFC controller 225 with the driving voltage Vcc of the PFC controller 225 only for a time proportional to the output load size sensed by the sensor 230. The LLC controller 320 continues to provide the driving voltage Vcc of the PFC controller 225 to the PFC controller 225 when the size of the output load exceeds a predetermined size. The LLC controller 320 provides the Vcc voltage to the PFC controller 225 only for the operating time proportional to the driving voltage Vcc of the PFC controller 225 within a predetermined size range when the output load is below the predetermined size.

The Vcc voltage supply operation of the LLC controller 310 may be performed asymmetrically with the control operation of the second switch 321 and the third switch 322. Specifically, there has been a case where the switching operation of the PFC circuit 220 is performed only in the drive control period of the second switch 321 and the third switch 322 of the LLC controller 320, but in this case, the control sequence is considerably complicated. However, the present disclosure controls the operation time of the PFC circuit 220 according to the size of the output load, and the switching of the PFC and the switching of the converter 300 can be performed asymmetrically.

The sensor 230 senses the size of the output load receiving the driving power. Specifically, the sensor 230 may include a photocoupler 232 and a diode 231.

The diode 231 varies the current flowing according to the size of the output load of the converter 300 and provides it to the photocoupler 232.

The photocoupler 232 provides voltage information corresponding to the size of the provided current to the converter 300.

As described above, the power supply apparatus 200 according to the present embodiment controls the driving time of the PFC in accordance with the size of the output load, so that the PFC operates even in the standby mode of the display apparatus, and thereby the conversion efficiency in the converter 300 is improved. Accordingly, the standby power of the power supply 200 also decreases.

Figure 5:
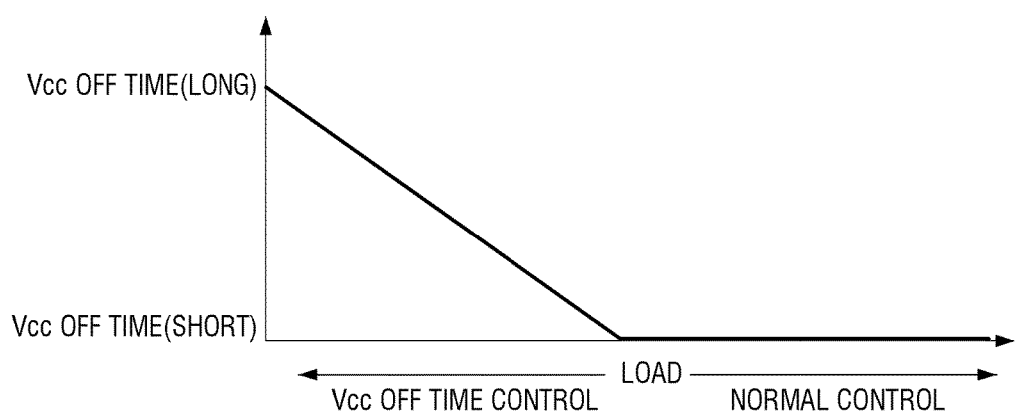
FIG. 5 is a diagram illustrating an example of Vcc off-time control operation based on an output load.

FIG. 5 is a diagram illustrating an example Vcc off-time control operation according to an output load.

Referring to FIG. 5, illustrates a relationship between the off period of the driving voltage Vcc of the PFC controller 225 and the size of the output load.

When the output load is small, the off period of the driving voltage Vcc of the PFC controller 225 is increased, and the operation time of the PFC controller 225 can be reduced. Conversely, when the output load is large, the off period of the drive voltage Vcc of the PFC controller 225 can be reduced, and the operation time of the PFC controller 225 can be increased. Further, the Vcc voltage can be continuously supplied to the PFC circuit 220 by preventing the Vcc off period from being present when the output load is higher than a specific output load.

As described above, even when the output load is low, the PFC circuit 220 does not stop but operates for a short period of time. Therefore, the converter 300 can perform transforming using the burst voltage, and thereby efficiency in a low output load can be improved. In addition, since the converter 330 can perform transforming using the burst voltage at all times, the input voltage of the LLC resonant circuit can be narrowly used, which is advantageous in designing the LLC known circuit.

Further, since the PFC circuit 220 is controlled by using the driving voltage of the PFC controller 225 instead of using a separate control signal, an additional circuit is not necessary, and the design is facilitated.

Figure 6:
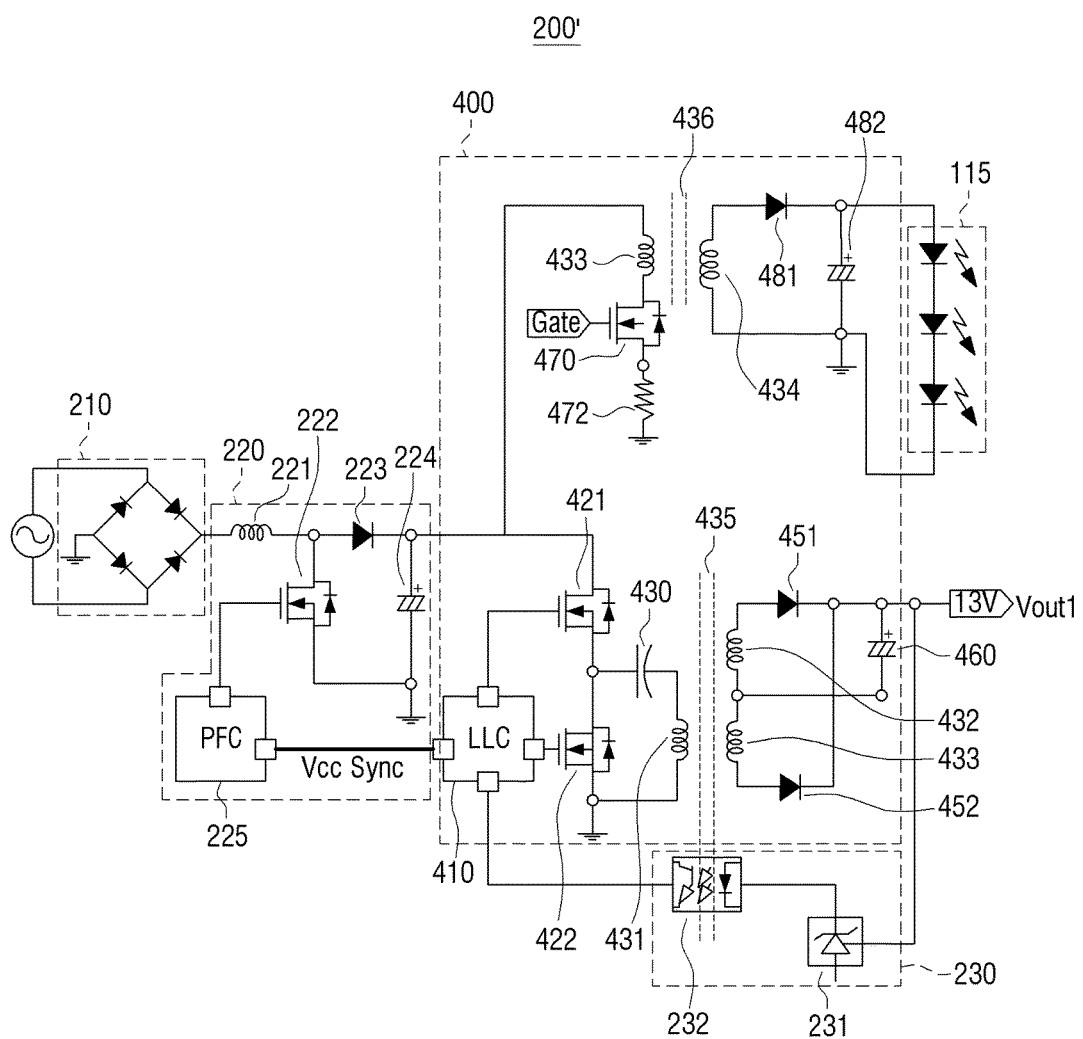
FIG. 6 is a circuit diagram illustrating an example power supply apparatus according to a second example embodiment of the present disclosure.

FIG. 6 is a circuit diagram illustrating an example power supply apparatus according to a second example embodiment of the present disclosure.

Referring to FIG. 6, the power supply 200' may include a rectifier 210, a PFC circuit 220, a converter 400, and a sensor 230.

The configuration of the rectifier 210, the PFC circuit 220, and the sensor 230 is the same as or similar to that of FIG. 4, and a duplicate description will be omitted.

The converter 400 converts the output voltage of the PFC circuit 220 to a first driving power supply and a second driving voltage and outputs the same. This converter 400 may be implemented as an LLC resonant converter, and when implemented as an LLC resonant converter, the converter 400 includes an LLC controller 410, a second switch 421, a third switch 422, a second capacitor 430, a first transformer 435, a second diode 451, a third diode 452, a third capacitor 460, a fourth switch 470, a resistor 472, a second transformer 436, a fourth diode 481, a fourth capacitor 482, and an LED driver (not shown).

The configuration of the LLC controller 410, the second switch 421, the third switch 422, the second capacitor 430, the first transformer, the second diode 451, the third diode 452 and the third capacitor 460 is the same as that of FIG. 4, and redundant description is omitted.

The second transformer 436 has a primary winding 433 and a secondary winding 434 and the primary winding 433 and the secondary winding 434 can have predetermined winding ratios. Here, the primary winding 433 has one end connected to the PFC 230 and the other end connected to one end of the fourth switch 470. One end of the secondary winding 433 is connected to the anode of the fourth diode 381 and the other end is connected to the other end of the fifth capacitor 482.

One terminal of the fourth switch 470 is connected to the other terminal of the primary winding 433, and the other terminal is grounded via a resistor 472. Here, the resistor 472 is for sensing the size of the current flowing in the primary winding, and the voltage of the resistor 472 may be provided to the LED driver (not shown). Accordingly, the LED driver can control the switching state of the fourth switch 470 using the voltage of the detected resistance. The LED driver may operate by receiving the dimming signal from the image signal generator 120 or the display 110 described above.

The second diode 451 has an anode connected to one end of the secondary winding 434 and a cathode connected to the fourth capacitor 482 and the backlight unit 115 in common.

One end of the fourth capacitor 482 is commonly connected to the cathode of the second diode 451 and the backlight unit 115 and the other end is connected to the other end of the secondary winding 434. Accordingly, the backlight unit 115 may operate based on the second driving voltage corresponding to the voltage size of the second capacitor 482.

As described above, the power supply device 200' according to the second embodiment generates a plurality of driving power supplies, and it is possible to provide power suitable for the display apparatus. Further, even in the power saving mode in the second embodiment, since the burst voltage is transmitted to the transformers 435 and 436, the change width of the input voltage of the transformers 435 and 436 is improved as compared with the conventional case.

As a result, the input voltage of the transformer 435 and 436 can be changed narrower, which is advantageous for the input/output margin. Also, even when the turn ratio of the primary and secondary windings of the transformer is configured, it is also possible to select the wire based on the portion where the temperature is advantageous.

Also, since the always burst voltage is input and the input voltage of the LLC resonant converter is set high, in the burst mode, even when the load rises sharply, it is possible to operate without changing the output voltage.

Figure 7:
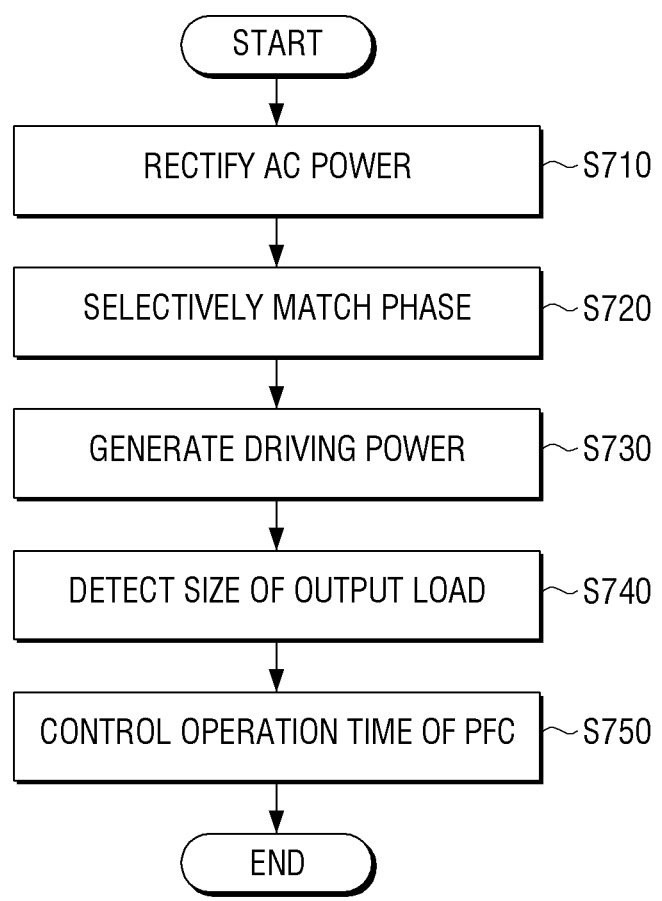
FIG. 7 is a flowchart illustrating an example power supply method according to an example embodiment of the present disclosure.

FIG. 7 is a flowchart illustrating an example power supply method according to an example embodiment of the present disclosure.

Referring to FIG. 7, external AC power is rectified to DC power, at operation S710.

The phase of the voltage and current of the rectified AC power source is selectively matched using the PFC performing power factor compensation, at operation S720. Specifically, power factor compensation can be performed by selectively outputting a power source rectified by using a PFC including an inductor and a switch element so that the voltage and current of the rectified AC power source are in phase.

A predetermined driving power is generated using the output voltage of the PFC, at operation S730. Specifically, the output voltage of the PFC can be transformed to a driving power having a predetermined size and output using the LLC resonant converter.

The size of the output load receiving the driving power is detected, at operation S740. Specifically, the size of the output load can be detected by using a photocoupler, a flyback circuit, a half bridge circuit, or the like.

The operation time of the PFC is controlled according to the size of the detected output load, at operation S750. Specifically, the operation time of the PFC can be controlled so as to operate for a time proportional to the sensed output load size. The operation time of the PFC is controlled so that the PFC always operates when the size of the output load exceeds the predetermined size. The operation time of the PFC can be controlled to have a proportional operation time within a predetermined size range when the output load size is less than a predetermined size.

Therefore, the power supply method according to the present embodiment controls the driving time of the PFC in correspondence with the size of the output load, so that the PFC operates even in the standby mode of the display apparatus, thereby improving the conversion efficiency in the converter 300. Accordingly, the standby power of the power supply 200 also decreases. The power supply method as shown in FIG. 7 may be performed on a display apparatus having the configuration of FIG. 1 or 2 or on a power supply device having the configuration of FIG. 3, or on a display apparatus or a power supply device having another configuration.

Further, the power supply method as described above can be implemented as a program including an executable algorithm that can be executed in a computer, and the above-described program may be stored in a non-transitory computer readable medium and provided.

The non-transitory computer readable medium refers to a medium that stores data and is readable by an apparatus. Specifically, the above-described programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

The foregoing example embodiments are merely examples and are not to be understood as limiting the present disclosure. The present disclosure can be readily applied to other types of apparatuses. Also, the description of example embodiments are intended to be illustrative, and not to limit the scope of the claims and their equivalents, and many alternatives, modifications, and variations will be apparent to those skilled in the art.

What is claimed is:

1. A display apparatus, comprising:
    a display configured to display an image;
    an image signal providing circuitry configured to provide an image signal to the display; and
    a power supply configured to generate driving power and to supply the generated driving power to the image signal provider,
    wherein the power supply comprises:
        a rectifier configured to rectify external AC power to DC power;
        a power factor compensation (PFC) circuit configured to selectively operate in a burst mode using the rectified DC power;
        a converter circuit configured to transform an output voltage of the PFC into a predetermined first output power and to output the transformed power; and
        a sensor configured to sense a size of an output load connected to the converter,
    wherein the converter is configured to control an operation time of the PFC circuit according to a duty ratio corresponding to the size of the output load sensed by the sensor,
    wherein the converter is configured to, based on the size of the output load exceeding a predetermined size, provide a Vcc voltage to the PFC circuit, and based on the size of the output load being equal to or less than a predetermined size, provide a Vcc voltage to the PFC circuit for a proportional operating time within the predetermined size range.

2. The apparatus as claimed in claim 1, wherein the power supply is further configured to control the operation time of the PFC circuit wherein the PFC circuit operates at a time proportional to the size of the output load.

3. The apparatus as claimed in claim 1, wherein the power supply is further configured to, in response to the size of the output load exceeding a predetermined size, control the PFC circuit to operate, and to, in response to the size of the output load being equal to or less than a predetermined size, control an operation time of the PFC circuit to have a proportional operation time within the predetermined size range.

4. The apparatus as claimed in claim 1, wherein the power supply is further configured to provide a Vcc voltage to the PFC circuit for the operation time.

5. The apparatus as claimed in claim 1, wherein the converter comprises:
    an LLC resonant converter circuit configured to operate using a plurality of switches; and
    an LLC controller circuit configured to control operations of the plurality of switches, and to control the operation time of the PFC circuit based on the size of the output load sensed by the sensor.

6. The apparatus as claimed in claim 5, wherein the LLC controller is further configured to provide a PFC controller of the PFC circuit with a Vcc voltage for a time proportional to the output load size sensed by the sensor.

7. The apparatus as claimed in claim 5, wherein the LLC controller is further configured to, in response to the size of the output load exceeding a predetermined size, provide a Vcc voltage to a PFC controller of the PFC circuit, and to, in response to the size of the output load being equal to or less than a predetermined size, provide a Vcc voltage to the PFC controller for a proportional operating time within the predetermined size range.

8. The apparatus as claimed in claim 5, wherein the LLC controller is further configured to control the plurality of switches and the operation time of the PFC circuit asymmetrically.

9. The apparatus as claimed in claim 1, wherein the PFC circuit comprises:
    an inductor having one end configured to receive the rectified DC power;
    a first switch having one end connected to another end of the inductor and having another end that is grounded;
    a first diode having an anode commonly connected to the one end of the first switch and the another end of the inductor and having a cathode connected to the converter; and a PFC controller configured to operate based on a Vcc voltage and to control an operation of the first switch.

10. The apparatus as claimed in claim 1, wherein the sensor includes at least one of: a photocoupler, a flyback circuit, and a half bridge circuit.

11. The apparatus as claimed in claim 1, wherein the display includes an LED backlight, and wherein the power supply is further configured to generate a second driving voltage having different voltage from the driving voltage, and to provide the generated second driving voltage to the LED backlight.

12. A power supply device, comprising:
a rectifier configured to rectify external AC power to DC power;
a power factor compensation (PFC) circuit configured to selectively operate in a burst mode using the rectified DC power;
a converter circuit configured to transform an output voltage of the PFC into a predetermined first output power and to output the transformed power; and
a sensor configured to sense a size of an output load connected to the converter,
wherein the converter is configured to control an operation time of the PFC circuit according to a duty ratio corresponding to the size of the output load sensed by the sensor,
wherein the converter is configured to, based on the size of the output load exceeding a predetermined size, provide a Vcc voltage to the PFC circuit, and based on the size of the output load being equal to or less than a predetermined size, provide a Vcc voltage to the PFC circuit for a proportional operating time within the predetermined size range.

13. The device as claimed in claim 12, wherein the converter comprises:
an LLC resonant converter circuit configured to operate using a plurality of switches; and
an LLC controller circuit configured to control the plurality of switches, and to control an operation time of the PFC circuit based on the size of the output load sensed by the sensor.

14. The device as claimed in claim 13, wherein the LLC controller is further configured to control a Vcc voltage to the PFC circuit for a time proportional to the output load size sensed by the sensor.

15. The device as claimed in claim 13, wherein the LLC controller is further configured to, in response to the size of the output load exceeding a predetermined size, provide a Vcc voltage to a PFC controller of the PFC circuit, and to, in response to the size of the output load being equal to or less than a predetermined size, provide a Vcc voltage to the PFC controller for a proportional operating time within the predetermined size range.

16. The device as claimed in claim 13, wherein the LLC resonant converter comprises:
a primary winding and a plurality of secondary windings connected to a center tab;
a second switch and a third switch connected in series;
a first capacitor having one end connected to the center tab and having another end connected to the primary winding;
a second diode having an anode connected to one end of one of the plurality of secondary windings;
a third diode having an anode connected to one end of another one of the plurality of secondary windings; and
a second capacitor having one end commonly connected to a cathode of the second diode and a cathode of the third diode, and having another end connected to the center tab.

17. The device as claimed in claim 12, wherein the PFC circuit comprises:
an inductor having one end configured to receive the rectified DC power;
a first switch having one end connected to another end of the inductor and having another end that is grounded;
a first diode having an anode commonly connected to the one end of the first switch and the another end of the inductor and having a cathode connected to the converter; and
a PFC controller configured to operate based on a Vcc voltage and to control an operation of the first switch.

18. The device as claimed in claim 12, wherein the sensor comprises at least one of: a photocoupler, a flyback circuit, and a half bridge circuit.

19. A power supply method of a power supply device, the method comprising:
rectifying external AC power to DC power;
selectively outputting the rectified DC power in a burst mode using a power compensation factor (PFC) circuit performing a power factor compensating operation;
transforming an output voltage of the PFC into a predetermined driving power;
sensing a size of an output load receiving the driving power; and
controlling an operation time of the PFC circuit according to a duty ratio corresponding to the sensed output load size,
wherein the power supply method further comprising, based on the size of the output load exceeding a predetermined size, providing a Vcc voltage to the PFC circuit, and based on the size of the output load being equal to or less than a predetermined size, providing a Vcc voltage to the PFC circuit for a proportional operating time within the predetermined size range.

* * * * *